United States Patent [19]

Iwata

[11] Patent Number: 4,951,630
[45] Date of Patent: Aug. 28, 1990

[54] IGNITION CONTROL SYSTEM FOR AN INTERNAL COMBUSTION ENGINE

[75] Inventor: Toshio Iwata, Himeji, Japan

[73] Assignee: Mitsubishi Denki Kabushiki Kaisha, Tokyo, Japan

[21] Appl. No.: 422,715

[22] Filed: Oct. 17, 1989

[30] Foreign Application Priority Data

Oct. 18, 1988 [JP] Japan .............................. 63-260638

[51] Int. Cl.$^5$ .............................................. F02P 5/00
[52] U.S. Cl. .................................... 123/435; 123/425
[58] Field of Search ............... 123/435, 425, 426, 417; 364/431.08

[56] References Cited

U.S. PATENT DOCUMENTS

| 4,531,399 | 7/1985 | Aono | 73/4 R |
| 4,745,902 | 5/1988 | Yagi et al. | 123/435 |
| 4,825,832 | 5/1989 | Satoh et al. | 123/435 |
| 4,838,228 | 6/1989 | Yonoyama | 123/435 |
| 4,848,299 | 7/1989 | Satoh et al. | 123/425 |
| 4,901,699 | 2/1990 | Uniwa et al. | 123/425 |

Primary Examiner—Raymond A. Nelli
Attorney, Agent, or Firm—Sughrue, Mion, Zinn, Macpeak & Seas

[57] ABSTRACT

An ignition control system for an internal combustion engine capable of determining appropriate ignition timing in an exact manner without employing a crank angle sensor so as to optimize the combustion of the mixture in the engine cylinders. To this end, a reference ignition timing is first determined based on the operating conditions (e.g., load condition) of the engine, and the internal pressure in the engine cylinder is sensed so that the state of combustion of a mixture in the engine cylinder is detected based on the engine cylinder internal pressure thus sensed. The reference ignition timing is then modified to provide an optimum ignition timing by an amount of modification which is calculated by using a peak point in time of the cylinder internal pressure at which a peak of combustion pressure in the engine cylinder takes place. A specific pressure in the engine cylinder which corresponds to the optimum ignition timing is calculated so that ignition is effected when the internal pressure in the engine cylinder as sensed becomes equal to the specific pressure thus calculated.

4 Claims, 3 Drawing Sheets

IGNITION CONTROL SYSTEM FOR AN INTERNAL COMBUSTION ENGINE

BACKGROUND OF THE INVENTION

1. Field of the Invention

The present invention relates to an ignition control system for an internal conbustion engine in which ignition timing is controlled by a microcomputer.

2. Description of the Related Art

In a known ignition control system for an internal combution engine, when the engine is operating, the rotational position of the crankshaft is first sensed by a crank angle sensor which is mounted on a camshaft of a distributor, the crank angle sensor outputting a signal representative of the sensed crankshaft rotational position to a microcomputer including a CPU, a RAM and a ROM so that the signal is temporarily stored in the RAM. An intake pressure sensor senses the intake pressure in the intake pipe or manifold of the engine representative of the engine load condition and outputs a signal representative of the sensed intake pressure to the CPU through an analog to digital (A/D) converter, which converts the output in the form of an analog signal of the intake pressure sensor into a digital signal, which is temporarily stored in the RAM. The CPU calculates the number of revolutions per minute of the engine based on an ignition period which is obtained through the crank angle sensor by using a calculation program previously stored in the ROM. Based on the number of revolutions per minute of the engine thus calculated and the output signal from the intake pressure sensor representative of the engine load condition, the CPU determines a target ignition timing from an ignition timing map previously stored in the ROM. The target ignition timing is then fed to an ignition device to turn on and off a power transistor incorporated therein for temporarily interrupting the current supply to the primary side of an ignition coil so that a high voltage is thereby generated on the secondary side of the ignition coil, thus causing a spark plug to electrically spark and ignite the air/fuel mixture in the corresponding engine cylinder.

With the above-mentioned ignition control system in which ignition timing is determined based on the output signal of the crank angle sensor, determination of ignition timing can not be made at all in the case of failure in the crank angle sensor, with the result that the engine is stopped. Further, the mounting position of the crank angle sensor, which is mounted on the camshaft in the distributor by a fastener such as a fastening belt or the like, may be sometimes displaced from the original correct position due, for example, to loosening or slackening of the fastening belt or the like so that the exact rotational position of the crankshaft can not be sensed.

SUMMARY OF THE INVENTION

In view of the above, the present invention is intended to obviate the above described problems of the known ignition control system.

An object of the present invention is to provide an ignition control system for an internal combustion engine which is capable of determining appropriate ignition timing in an exact manner without employing a crank angle sensor so as to optimize the combustion of the mixture in the engine cylinders.

In accordance with the above and other objects, the present invention resides in an ignition control system for an internal combustion engine having an engine cylinder and a crankshaft comprising:

cylinder internal pressure sensing means for sensing the pressure in the engine cylinder and generating an output representative of the sensed engine cylinder pressure;

first ignition timing determining means for determining a reference ignition timing based on the operating conditions of the engine;

ignition timing modifying means connected to receive the output of the cylinder internal pressure sensing means for sensing the state of combustion of a mixture in the engine cylinder based thereon and determining an amount of modification of ignition timing with respect to the reference ignition timing so as to optimize the ignition timing;

second ignition timing determining means for determining an optimum iginition timing based on the reference igintion timing and the amount of modification of ignition timing:

reference signal generating means for calculating a specific pressure in the engine cylinder which corresponds to the optimum ignition timing determined by the second ignition timing determining means and generating a reference signal representative of the specific pressure;

ignition signal generating means for generating an ignition signal at the time when the output of the cylinder internal pressure sensing means becomes equal to the output of the reference signal generating means; and igniting means connected to receive the output of the ignition signal generating means for igniting the engine when it receives an ignition signal from the ignition signal generating means.

Preferably, the ignition timing determining means comprises: engine load sensing means for sensing an engine load; ignition period sensing means for sensing the ignition period of the engine; and a microcomputer connected to receive the outputs of the engine load sensing means and the ignition period sensing means, the mircocomputer calculating the number of revolutions per minute of the engine based on the output of the ignition period sensing means, the microcomputer further determining the reference ignition timing based on the sensed engine load and the calculated number of revolutions per minute of the engine.

Preferably, the ignition timing modifying means comprises: peak sensing means for sensing a peak point in time at which a peak of combustion pressure in the engine cylinder takes place; and a microcomputer connected to receive the output of the peak sensing means for calculating an average value of the difference between the sensed peak point and the reference ignition timing every engine cycle and calculating the amount of modification based on the average value of the difference.

The above and other objects, features and advantages of the present invention will become apparent from the following detailed description of a presently preferred embodiment of the invention taken in conjunction with the accompanying drawings.

DESCRIPTION OF PREFERRED EMBODIMENTS

The present invention will now be described in detail with reference to a presently preferred embodiment thereof as illustrated in the accompanying drawings.

Figure 1:
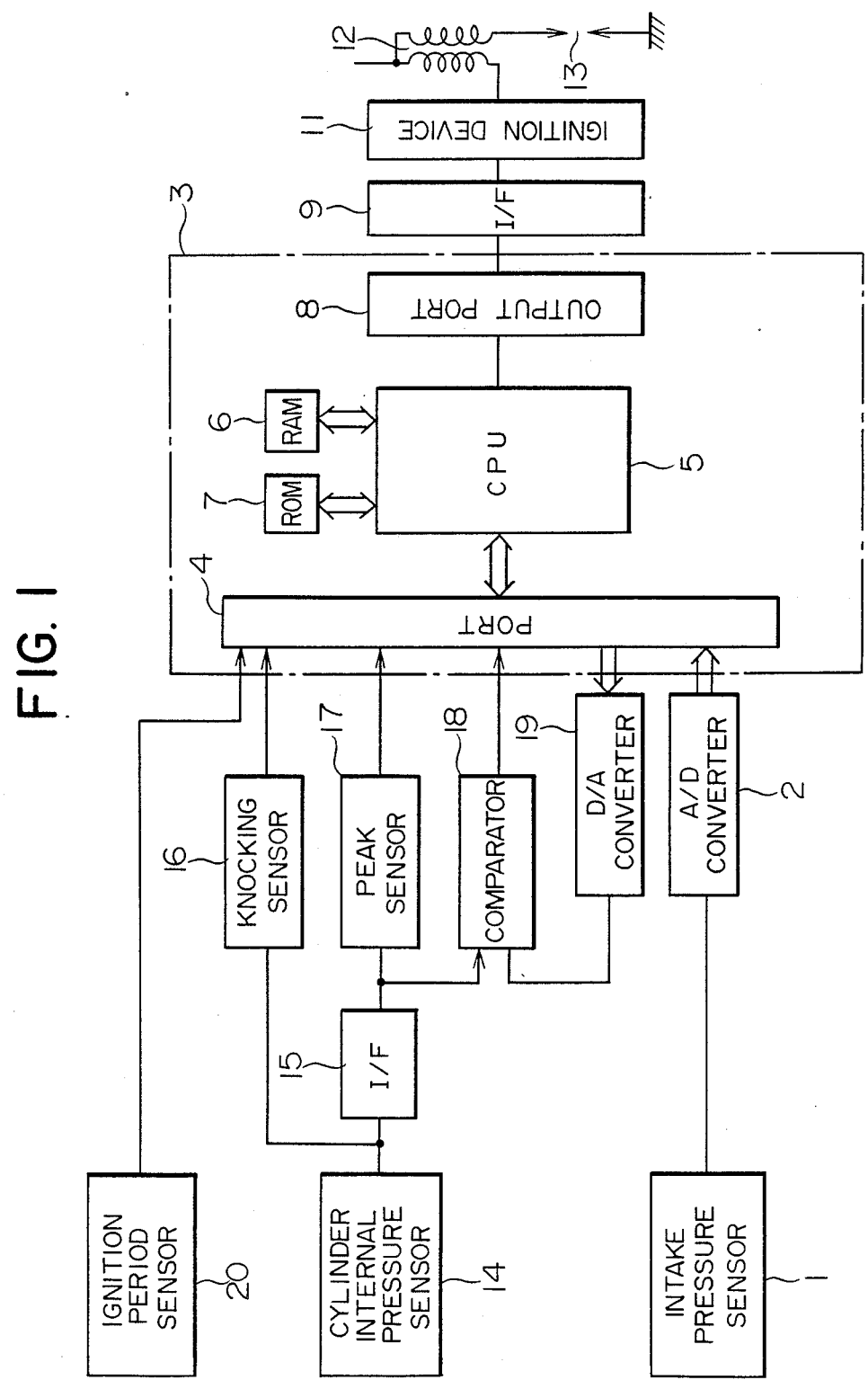
FIG. 1 is a block diagram of an ignition control system for an internal combustion engine in accordance with a presently preferred embodiment of the invention.

In FIG. 1, there is schematically illustrated in block form an ignition control system for an internal combustion engine which includes a load sensor 1 in the form of an intake pressure sensor for sensing an engine load (e.g., the intake pressure in an intake pipe or manifold of the engine), and an analog to digital (A/D) converter circuit 2 for converting the analog output of the intake pressure sensor 1 into a digital signal which is appropriate for precessing by a microcomputer 3. The microcomputer 3 comprises a port 4 connected at its input side with the output terminal of the A/D converter circuit 2 through a bus, a CPU 5 connected through a bus with the port 4, a RAM 6 and a ROM 7 connected with the CPU 5 through respective buses, and an output port 8 connected with the CPU 5. The ROM 7 beforehand stores an ignition timing determination program, a number-of-revolutions-per-minute versus ignition-timing map, an engine-load versus ignition-timing map and the like. The output port 8 of the microcomputer 3 is connected with an ignition device 11 in the form of a well-known type igniter through an interface 9. The ignition device 11 has a power transistor (not shown) coupled with the primary side of an ignition coil 12 so that the power transistor is turned on and off to generate a high voltage on the secondary side of the ignition coil 12, thereby causing a spark plug 13 connected with the secondary side of the ignition coil 12 to spark, whereby the air/fuel mixture in the engine cylinder is ignited.

A cylinder internal pressure sensor 14 is provided for sensing the pressure in a combustion chamber of an engine cylinder, an interface 15 coupled at its input side with the cylinder internal pressure sensor 14, a knocking sensor 16 coupled at its input side with the cylinder internal pressure sensor 14 for sensing knocking in the engine cylinder based on the output of the cylinder internal pressure sensor 14 and at its output side with the port 4 for outputting a knocking signal to the port 4 when knocking is sensed, a peak position sensor 17 coupled at its input side with the interface 15 for sensing the position (i.e., point in time) of the peak in the output of the cylinder internal pressure sensor 14 and at its output side with the port 4, and a comparator 18 having two input terminals one of which is coupled with the interface 15 and the other of which is coupled with the output side of a digital to analog (D/A) converter 19, and one output terminal coupled with the port 4. The D/A converter 19 is coupled at its input side with the CPU 5 through a bus and the port 4. An ignition period sensor 20 for sensing the period of ignition of the engine is also connected with the CPU 5 through the port 4.

Figure 2:
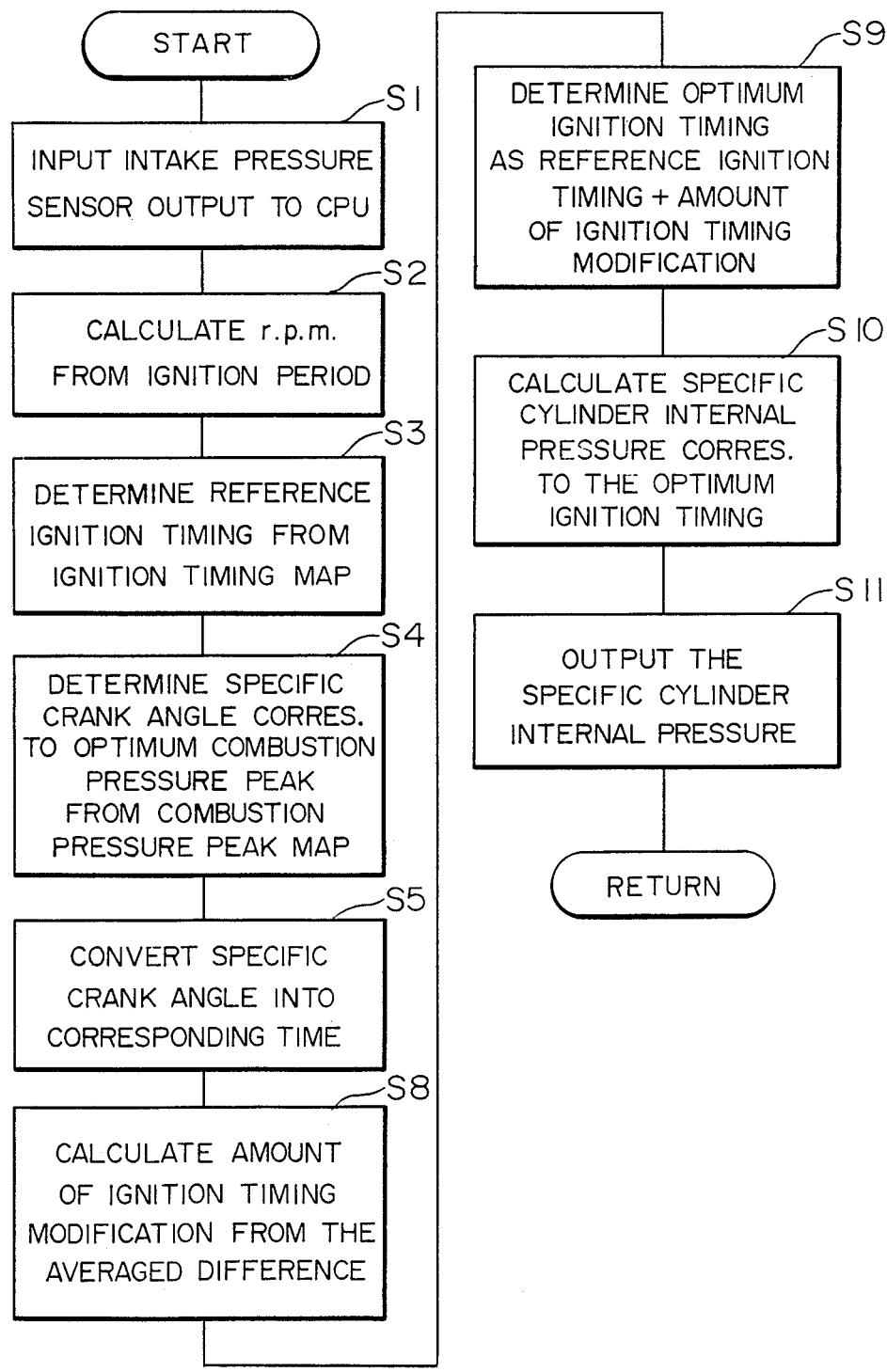
FIG. 2 is a flowchart showing a main routine for the general operational process of the ignition control system of FIG. 1.
Figure 3A:
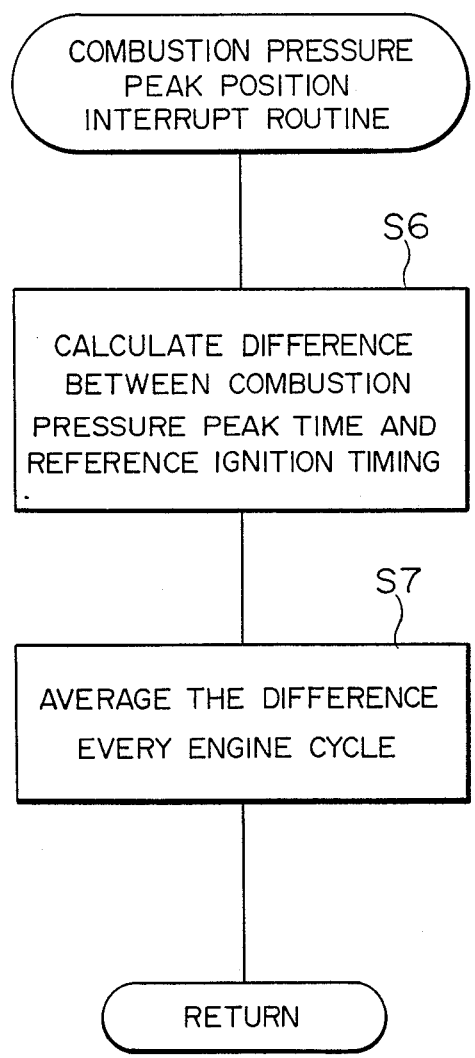
FIG. 3(a) is a flowchart showing a combustion-pressure-peak-position interrupt routine for calculating an amount of modification of ignition timing which is used in the process of FIG. 2.

FIG. 2 is a flowchart showing a main routine for the operation of the ignition control system of FIG. 1. As illustrated in this flowchart, the output of the intake pressure sensor 1 representative of the sensed pressure in an intake pipe or manifold of the engine is converted from an analog value into a digital value by the A/D converter 2, and the digital value thus converted is then input to the CPU 5 of the microcomputer 3 through the port 4 in Step S1. Subsequently in Step S2, the CPU 5 calculates the number of revolutions per minute of the engine based on the period of ignition which is sensed by the ignition period sensor 20. The control program then proceeds to Step S3 where a reference ignition timing corresponding to the intake pressure sensed by the intake pressure sensor 1 and the number of revolutions per minute of the engine as previously determined in Steps S1 and S2 is determined from an ignition timing map stored in the ROM 7. Thereafter in Step S4, the CPU 5 determines from a combustion pressure peak map stored in the ROM 7 a specific crank angle corresponding to an optimum combustion pressure peak based on the sensed intake pressure and the calculated number of revolutions per minute of the engine. In Step S5, the specific crank angle thus determined is converted by the microcomputer 3 into a corresponding point in time which is then set into a built-in timer counter. After S5, the main routine is interrupted so that the control program jumps into a combustion-pressure-peak-position determining routine as illustrated in FIG. 3(a).

Thus, in Step S6 as shown in FIG. 2(a), a difference in time between a point in time at which a peak in the combustion pressure appears and the value previously set into the timer counter is calculated, and in Step S7, the difference thus calculated is averaged every engine cycle. After Step S7, the control program returns to the main routine, i.e., it goes to Step S8 in FIG. 2 where an amount of modification of ignition timing is calculated based on the averaged value of the difference. Subsequently in Step S9, a specific ignition timing is determined as the sum of the reference ignition timing and the amount of modification of ignition timing. Then is Step S10, the pressure in the combustin chamber of the engine cylinder corresponding to the thus determined specific ignition timing is calculated from the intake pressure in the intake pipe or manifold as sensed by the intake pressure sensor 1 in the following manner.

Designating the pressure in and the internal volume of the combustion chamber in the engine cylinder as P and V, respectively, the following equation is established:

$$P \cdot V = \text{constant.}$$

Here, $$V = r(1 - \cos\theta) \cdot S + \alpha \tag{1}$$

where
  r = the radius of rotaion of the crank shaft
  $\theta$ = the crank angle measured from the point at which iginition occurs;
  S = the cross-sectional area of the piston; and
  $\alpha$ = the volume of the combustion chamber at TDC.
In this connection, it is to be noted that r, S and $\alpha$ are respectively of constant values.

Accordingly, the internal pressure P in the combustion chamber of the cylinder (hereinafter referred to as cylinder internal pressure) is described as follows.

$$P=\{r(1-\cos\theta_0)\cdot S+\alpha\}/\{r(1-\cos\theta)\cdot S+\alpha\}\cdot P_0 \quad (2)$$

where
$P_0$ = a reference pressure (equal to the pressure in the intake pipe or manifold); and
$\theta_0$ = a reference crank angle (corresponding to the crank angle at which an intake valve is closed).

Substituting known values for the constants in equation (2) above, the cylinder internal pressure P is calculated as a function of the crank angle $\theta$. Thus, a specific cylinder internal pressure for ignition is ignition is to take place.

Thereafter in Step S11, the CPU 5 outputs the result of the above calculation (i.e., the specific cylinder internal pressure) thus obtained to the D/A converter 19 through the port 4. The D/A converter 19 converts the digitalized input from the CPU 5 into an analog value which is then input to one of the input terminals of the comparator 18.

Figure 3B:
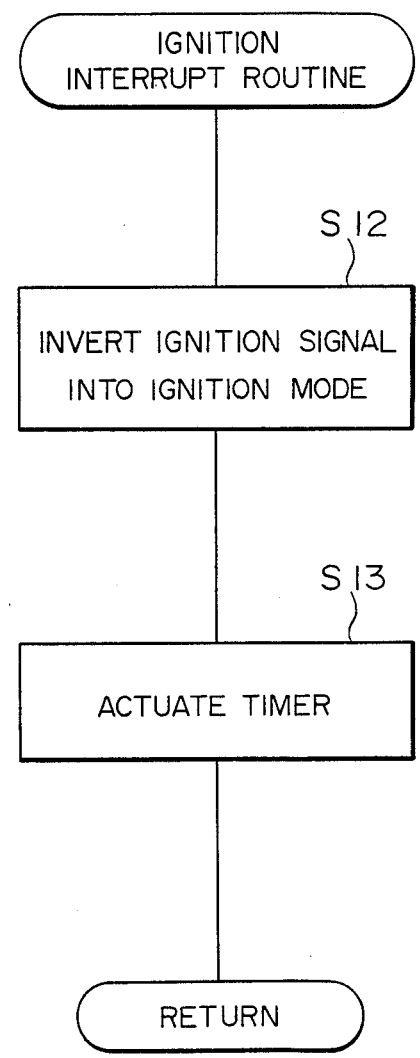
FIG. 3(b) is a flowchart showing an ignition interrupt routine for effecting ignition of the ignition control system of FIG. 1.

On the other hand, imposed on the other input terminal of the comparator 18 is the output of the cylinder internal pressure sensor 14 through the interface 15. When the output of the cylinder internal pressure sensor 14 becomes equal to the calculated specific value which is input to the one input terminal of the comparator 18 from the CPU 5, the comparator 18 outputs a matching signal to the CPU 5 through the port 4. When the CPU 5 receives the matching signal, the main routine is interrupted so that the control program jumps into a usual ignition interrupt routine as shown in FIG. 3 (b) wherein ignition is effected in a conventional manner. That is, the ignition signal, which is output from the CPU 5 to the ignition device 11 through the output port 9 and the interface 10, is inverted into the ignition mode (e.g., from a low to a high level) so as to start the current supply to the ignition coil 12 in Step S12, and at the same time a timer incorporated in the ignition device 11 is actuated in Step S13. When a predetermined time set in the timer has elapsed, the current supply to the ignition coil 12 is stopped so that a high voltage is developed on the secondary side of the ignition coil 12 thereby to cause the spark plug 13 to spark. In this manner, it is possible to precisely control ignition timing by use of the cylinder internal pressure without employing any crank angle sensor.

What is claimed is:

1. An ignition control system for an internal combustion engine having an engine cylinder and a crankshaft comprising:
    cylinder internal pressure sensing means for sensing the pressure in the engine cylinder and generating an output representative of the sensed engine cylinder pressure;
    first ignition timing determining means for determining a reference ignition timing based on the operating conditions of the engine;
    ignition timing modifying means connected to receive the output of said cylinder internal pressure sensing means for sensing the state of combustion of a mixture in the engine cylinder based thereon and determining an amount of modification of ignition timing with respect to said reference ignition timing so as to optimize the ignition timing;
    second ignition timing determining means for determining an optimum ignition timing based on said reference ignition timing and said amount of modification of ignition timing;
    reference signal generating means for calculating a specific pressure in the engine cylinder which corresponds to the optimum ignition timing determined by said second ignition timing determining means and generating a reference signal representative of said specific pressure;
    ignition signal generating means for generating an ignition signal at the time when the output of said cylinder internal pressure sensing means becomes equal to the output of said reference signal generating means; and
    igniting means connected to receive the output of said ignition signal generating means for igniting the engine when it receives an ignition signal from said ignition signal generating means.

2. An ignition control system for an internal combustion engine as claimed in claim 1, wherein said ignition timing determining means comprises:
    engine load sensing means for sensing an engine load;
    ignition period sensing means for sensing the ignition period of the engine; and
    a microcomputer connected to receive the outputs of said engine load sensing means and said ignition period sensing means, said microcomputer calculating the number of revolutions per minute of the engine based on the output of said ignition period sensing means, said microcomputer further determining said reference ignition timing based on the sensed engine load and the calculated number of revolutions per minute of the engine.

3. An ignition control system for an internal combustion engine as claimed in claim 1, wherein said ignition timing modifying means comprises:
    peak sensing means for sensing a peak point in time at which a peak of combustion pressure in the engine cylinder takes place; and
    a microcomputer connected to receive the output of said peak sensing means for calculating an average value of the difference between said sensed peak point and said reference ignition timing every engine cycle and calculating said amount of modification based on said average value of the difference.

4. An ignition control system for an internal combustion engine as claimed in claim 1, wherein said reference signal generating means calculates said specific pressure in the engine cylinder corrresponding to said optimum ignition timing using the following formula;

$$P=\{r(1-\cos\theta_0)\cdot S+\alpha\}/\{r(1-\cos\theta)\cdot S+\alpha\}\cdot P_0$$

where
P = specific pressure in the engine cylinder;
$P_0$ = a reference pressure (equal to the pressure in the intake manifold);
r = the radius of rotation of the crank shaft;
$\theta$ = the crank angle measured from the point at which ignition occurs;
$\theta_0$ = a reference crank angle (corresponding to the crank angle at which an intake valve is closed);
S = the cross-sectional area of the piston;
$\alpha$ = the volume of the combustion chamber at TDC.

* * * * *